US008165071B2

(12) United States Patent
Murata et al.

(10) Patent No.: US 8,165,071 B2
(45) Date of Patent: Apr. 24, 2012

(54) MOBILE TERMINAL AND METHOD OF CONTROLLING RECEPTION OF THE SAME

(75) Inventors: Syuuichi Murata, Kawasaki (JP); Makoto Uchishima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 848 days.

(21) Appl. No.: 11/790,578

(22) Filed: Apr. 26, 2007

(65) Prior Publication Data

US 2008/0002618 A1    Jan. 3, 2008

(30) Foreign Application Priority Data

Jun. 30, 2006  (JP) ................ 2006-182416

(51) Int. Cl.
*H04Q 7/00* (2006.01)
(52) U.S. Cl. ........................... 370/329; 370/335
(58) Field of Classification Search ............. 455/423, 455/429, 453, 456.6, 561, 522, 226, 1, 63.1, 455/67.1; 370/329, 252, 335, 352, 431
See application file for complete search history.

(56) References Cited

U.S. PATENT DOCUMENTS

| 7,590,389 B2 * | 9/2009 | Anderson .................. 455/67.7 |
| 2002/0141367 A1 | 10/2002 | Hwang et al. |
| 2004/0202104 A1 | 10/2004 | Ishii et al. |
| 2004/0266469 A1 * | 12/2004 | Hayashi et al. .............. 455/522 |
| 2005/0250540 A1 | 11/2005 | Ishii et al. |
| 2005/0254463 A1 | 11/2005 | Suzuki et al. |
| 2006/0003702 A1 | 1/2006 | Nibe et al. |
| 2006/0133402 A1 * | 6/2006 | Dottling et al. .............. 370/431 |
| 2006/0256758 A1 * | 11/2006 | Malkamaki et al. ......... 370/335 |

FOREIGN PATENT DOCUMENTS

| JP | 2002344560 | 11/2002 |
| JP | 2002-369258 | 12/2002 |
| JP | 2004080306 | 3/2004 |
| JP | 2004-312530 | 11/2004 |
| JP | 2005-318470 | 11/2005 |
| JP | 2005328317 | 11/2005 |

(Continued)

OTHER PUBLICATIONS

3rd Generation Partnership Project: Technical Specification Group Radio Access Network: Physical Layer Procedures (FDD): (Release 7) (3GPP TS25.214 V7.0.0).
"Personal Digital Cellular Telecommunication System" ARIB Standard PCR STD-27, Edition 1, vol. 1 Association of Radio Industries and Business Jul. 25, 2000.

(Continued)

*Primary Examiner* — Dwayne Bost
*Assistant Examiner* — Myron Wyche
(74) *Attorney, Agent, or Firm* — Murphy & King, P.C.

(57) ABSTRACT

A mobile terminal (and a method of controlling reception of the mobile terminal) can receive a given channel (second channel) even when a different channel (first channel) cannot appropriately be received, in the HSDPA transmission system for transmitting information necessary for a receiving process for the second channel through the first channel. The mobile terminal includes: first channel receiving processor performing a receiving process for the first channel and acquiring information regarding a receiving process for the second channel; second channel receiving processor performing the receiving process for the second channel using the information; holder holding the information; and reception controller controlling each of the channel receiving processor and the holder in such a way that the second channel receiving processor performs a receiving process for a newly received second channel using the information held in the holder.

14 Claims, 9 Drawing Sheets

| | FOREIGN PATENT DOCUMENTS | |
|---|---|---|
| JP | 200620156 | 1/2006 |
| JP | 2006505221 | 2/2006 |
| WO | 2004042982 | 5/2004 |
| WO | 2005079221 | 1/2005 |

OTHER PUBLICATIONS

Japanese Notice of Rejection on Jan. 25, 2011 in relation to Japanese Patent Application No. 2006-182416.

* cited by examiner

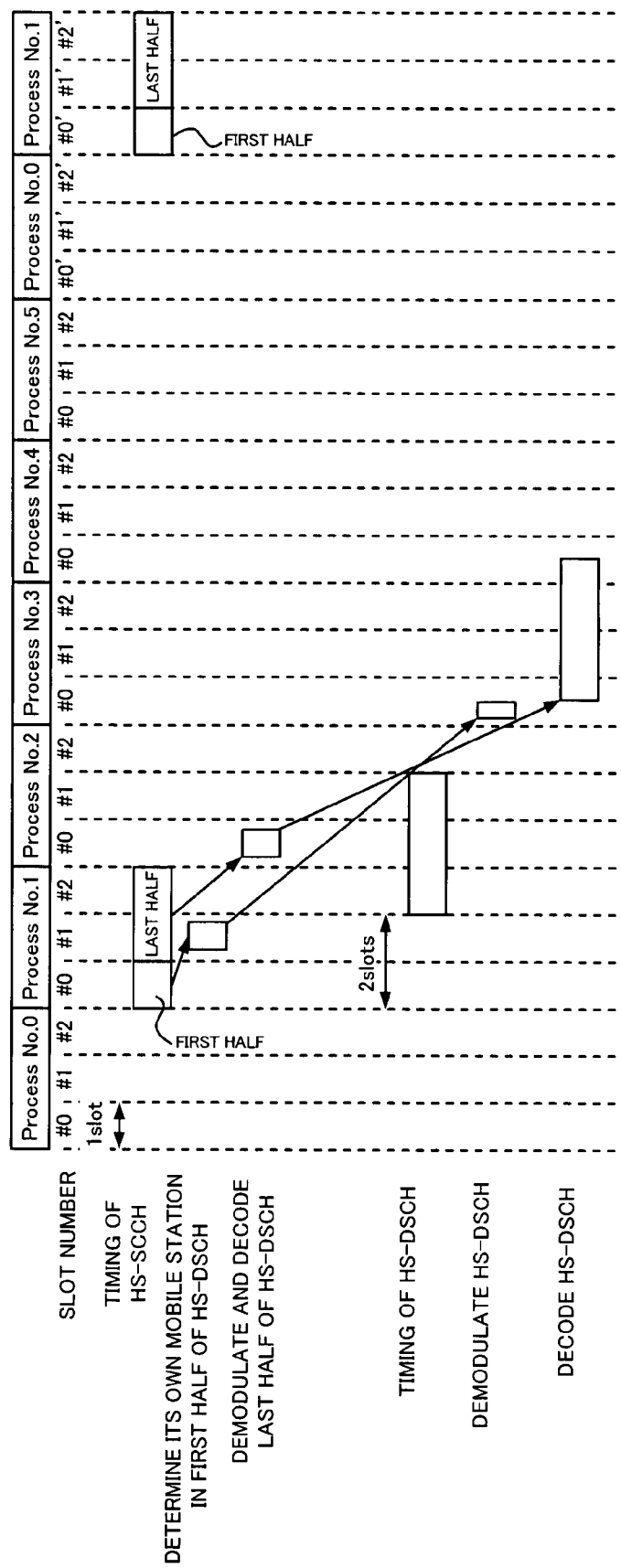

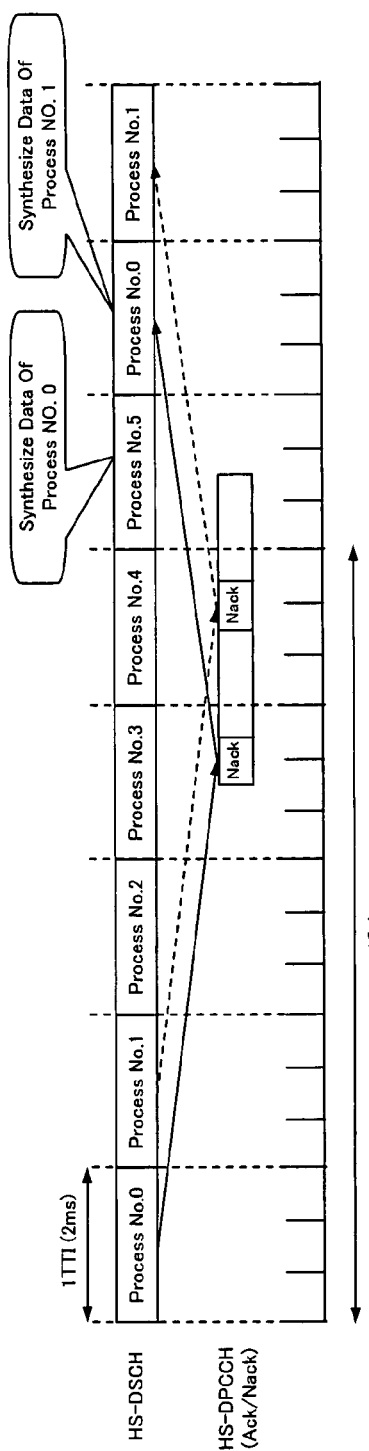
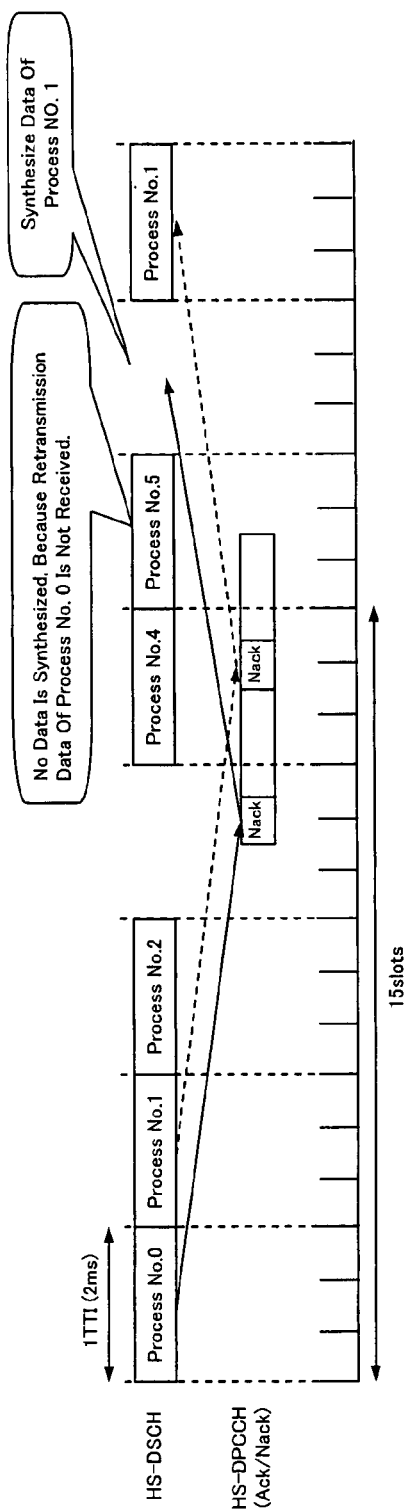
FIG. 7A
FIG. 7B

FIG. 8

| CQI VALUE | TRANSPORT BLOCK SIZE | CODE MULTIPLEXING NUMBER | MODULATION PROCEDURE |
|---|---|---|---|
| 1 | 137 | 1 | QPSK |
| 2 | 173 | 1 | QPSK |
| 3 | 233 | 1 | QPSK |
| 4 | 317 | 1 | QPSK |
| 5 | 377 | 1 | QPSK |
| 6 | 461 | 1 | QPSK |
| 7 | 650 | 2 | QPSK |
| 8 | 792 | 2 | QPSK |
| 9 | 931 | 2 | QPSK |
| 10 | 1262 | 3 | QPSK |
| 11 | 1483 | 3 | QPSK |
| 12 | 1742 | 3 | QPSK |
| 13 | 2279 | 4 | QPSK |
| 14 | 2583 | 4 | QPSK |
| 15 | 3319 | 5 | QPSK |
| 16 | 3565 | 5 | 16-QAM |
| 17 | 4189 | 5 | 16-QAM |
| 18 | 4664 | 5 | 16-QAM |
| 19 | 5287 | 5 | 16-QAM |
| 20 | 5887 | 5 | 16-QAM |
| 21 | 6554 | 5 | 16-QAM |
| 22 | 7168 | 5 | 16-QAM |
| 23 | 7168 | 5 | 16-QAM |
| 24 | 7168 | 5 | 16-QAM |
| 25 | 7168 | 5 | 16-QAM |
| 26 | 7168 | 5 | 16-QAM |
| 27 | 7168 | 5 | 16-QAM |
| 28 | 7168 | 5 | 16-QAM |
| 29 | 7168 | 5 | 16-QAM |
| 30 | 7168 | 5 | 16-QAM |

MOBILE TERMINAL AND METHOD OF CONTROLLING RECEPTION OF THE SAME

CROSS REFERENCE TO RELATED APPLICATION(S)

This application is based on and hereby claims priority to Japanese Application No. 2006-182416 filed on Jun. 30, 2006 in Japan, the contents of which are hereby incorporated by reference.

BACKGROUND OF THE INVENTION

1) Field of the Invention

The present invention relates to a mobile terminal and a method of controlling reception of the same, and relates to a technique suitably applied in a system using, for example, an HSDPA (Hi-Speed Downlink Packet Access) transmission system that is one transmission system in the mobile communication system.

2) Description of the Related Art

A W-CDMA (Wideband-Code Division Multiple Access) system is a 3rd generation mobile communication system, and is being standardized by the 3GPP (3rd Generation Partnership Project). The HSDPA is provided as a system for realizing the maximum transmission speed of 14 Mbps through a downlink, as one of the themes of the standardization.

The HSDPA uses the adaptive coding modulation procedure. One feature of the HSDPA is to adaptively switch between, for example, the QPSK (Quadrature Phase Shift Keying) modulation procedure and the 16QAM (Quadrature Amplitude Modulation) system in accordance with the wireless environment between a base station and a mobile terminal device (hereinafter referred to also as a mobile station).

The HSDPA uses an H-ARQ (Hybrid Automatic Repeat reQuest) system. In the H-ARQ, when the mobile station detects an error in data received from the base station, the data is retransmitted from the base station in response to a request from the mobile station. Then, the mobile station performs error correction decoding using both of the already-received data and the retransmitted data. In this manner, in the H-ARQ, the already-received data is effectively used even if an error occurs, thereby enhancing the gain of the error correction decoding and reducing the number of retransmission.

The HSDPA uses mainly the following wireless channels of HS-SCCH (High Speed-Shared Control Channel) HS-DSCH (High Speed-Downlink Shared Channel), HS-DPCCH (High Speed-Dedicated Physical Control Channel).

Both of the HS-SCCH and the HS-DSCH are downlink (i.e. in a direction from the base station to the mobile station) shared channels. The HS-SCCH is a control channel for sending various parameters (L1 information) regarding data to be sent through the HS-DSCH. In this case, various parameters includes modulation type information (representing with which modulation procedure data is sent through the HS-DSCH), an assigned number of a diffusion code (code multiplexing number) a process number of HS-DSCH, a retransmission/new indicator representing whether transmission data is to be retransmitted and a pattern of rate matching to be performed for the transmission data.

In the HS-SCCH, control signals can concurrently be sent to a plurality of mobile stations using a plurality of diffusion codes (e.g. four codes). Of the plurality of HS-SCCHs, the mobile station can determine the HS-SCCH that is addressed thereto, based on a UE-ID (User Equipment-Identity).

On the other hand, the HS-DPCCH is an individual control channel in the uplink direction from the mobile station to the base station, and is used when the mobile station sends an ACK or NACK signal to the base station in accordance with whether data received through the HS-DSCH can be received or not. When the mobile station fails to receive data (i.e. when a CRC (Cyclic Redundancy Check) error is found in the received data), the base station controls a retransmission process in response to a NACK signal sent from the mobile station.

Further, the HS-DPCCH is used when the mobile station sends a measurement result of reception quality (e.g. an SIR: Signal to Interference Ratio) of a received signal from the base station, to the base station as a CQI (Channel Quality Indicator). The base station determines whether the downlink wireless environment is favorable based on the received CQI. If it is determined that the downlink wireless environment is favorable, the modulation procedure is switched to one capable of transmitting data at a high speed. On the contrary, if it is determined that the downlink wireless environment is not favorable, the modulation procedure is switched to a procedure for transmitting data at a low speed (i.e. adaptive modulation is performed).

In the HSDPA, before and after a rate matching process is performed, a ratio of a small amount of HS-DSCH data becomes lower than that of a large amount of HS-DSCH data, thus possibly realizing favorable transmission characteristics.

Note that the term "ratio before and after the rate matching" relates to a rate matching process on the sender side (base station), as exemplarily shown in FIG. 9, and can be expressed by the relationship of the (ratio before and after the rate matching)=(information bit length)÷(bit length after the rate matching). The lower the value of the "ratio before and after the rate matching" is, the higher the ratio of the transmission power per bit becomes, because redundancy is introduced to a small amount of information so as to become transmission data of a large bit length, thus realizing favorable transmission characteristics.

On the other hand, data of the HS-SCCH has a constant number of information bits at the time of data transmission. In the communication environment of a low SIR, favorable transmission characteristics are not realized, even if the above transmission control is performed based on the CQI.

Japanese Patent Application Laid-Open No. 2004-312530 discloses a technique for improving the transmission power for the HS-SCCH, when the reception of the HS-SCCH is deteriorated.

Japanese Patent Application Laid-Open No. 2005-318470 discloses a technique for the transmission control on the side of the mobile station. According to this technique, a BLER of the HS-DSCH becomes constant by adding an offset to the CQI sent from the mobile station for the sake of modulation.

Further, Japanese Patent Application Laid-Open No. 2002-369258 discloses a technique for efficiently sending control information from the mobile station to the base station.

3rd Generation Partnership Project; Technical Specification Group Radio Access Network; Physical Layer procedures (FDD) (Release 7) (3GPP TS25.214V7.0.0 (2006-03)) discloses the above-described conventional technique.

In the HSDPA reception, the HS-SCCH is received, and the parameters are extracted therefrom. Then, the HS-DSCH is received. Depending on the transmission environment and different coding systems between the HS-SCCH/HS-DSCH, the HS-SCCH may not be received, while the HS-DSCH may be received. In such an environment, the HS-DSCH may fail to be received.

The below describes the problems and related techniques.

[1] Channel Configuration and its Timing Relationship in HSDPA

FIG. 4 is a diagram showing the channel configuration and its timing relationship in the HSDPA. Because the W-CDMA uses a code division multiplex system, each channel is divided by code. Though not illustrated, the mobile station uses a CPICH (Common Pilot Channel) as a channel for sending a so-called pilot signal. This channel is used for channel estimation, cell search and timing reference for another down physical channel with in the same cell, in the mobile station. In addition, the mobile station uses a P-CCPCH (Primary Common Control Physical Channel) as a channel for sending report information.

As shown in FIG. 4, in each channel, one frame (10 ms) is composed of fifteen slots.

The frame head of the HS-DSCH delays by two slots as compared to the HS-SCCH. This delay enables the mobile station to demodulate the HS-DSCH using a demodulation procedure corresponding to a modulation procedure represented in the received information, after it receives the information through the HS-SCCH. Each of the HS-SCCH and HS-DSCH includes one sub-frame composed of three slots.

The HS-DPCCH is a channel of an uplink direction. The first slot of the HS-DPCCH is used for sending an ACK/NACK signal representing a result of the received HS-DSCH from the mobile station to the base station approximately after 7.5 slots since the reception of the HS-DSCH. The second and third slots are used for sending CQI information for controlling the adaptive modulation periodically to the base station for the sake of feedback transmission. In this case, the CQI information to be sent is generated based on the receiver environment (e.g. a result of measured SIR) that is measured in a period that is four to one slot prior to the CQI transmission.

[2] Data Contents to be Sent Through HS-SCCH and Its Encoding Procedure

The following (1) to (7) are examples of data to be sent through the HS-SCCH. Each of the following data is used for a receiving process for corresponding HS-DSCH (delay of two slots).

(1) $X_{ccs}$ (Channelization Code Set information)
(2) $X_{ms}$ (Modulation Scheme information)
(3) $X_{tbs}$ (Transport Block Size information)
(4) $X_{hap}$ (Hybrid ARQ Process information)
(5) $X_{rv}$ (Redundancy and constellation Version)
(6) $X_{nd}$ (New Data indicator)
(7) $X_{ue}$ (User Equipment identify)

Note that (1) "$X_{ccs}$" represents a diffusion code for sending data through the HS-DSCH (e.g. data representing a combination of a multicode number and a code offset), and is formed of seven bits.

(2) $X_{ms}$ represents whether the modulation procedure of the HS-DSCH is either QPSK or 16QAM, and is formed of one bit.

(3) $X_{tbs}$ is used for calculating a transport block size of data to be transmitted through the HS-DSCH (i.e. the size of data to be sent in one sub-frame of the HS-DSCH), and is formed of six bits.

(4) $X_{hap}$ represents a process number of H-ARQ, and is formed of three bits.

The base station cannot determine whether already-transmitted data can be received by the mobile station until an ACK or NACK signal is received. However, the base station sends a new packet before an ACK or NACK signal is received, because the transmission efficiency decreases if it waits for the ACK or NACK signal.

Since the mobile station uses the H-ARQ system, it needs to identify with which received data retransmission data should be synthesized. Process numbers (e.g. 0, 1, . . . , 7 up to 8) are defined for the respective data to be sent in the sub-frames. When the same process number exists, the corresponding HS-DSCH data can be synthesized. It takes at least 6TTI (Transmission Time Interval) (1TTI=2 ms in this case) all the way through since the mobile station performs a CRC process upon reception of the previous HS-DSCH data, sends a NACK signal to the base station, and receives retransmission data from the base station. Therefore, the retransmission data should not be synthesized in a period less than 6TTI.

(5) $X_{rv}$ represents a rate matching patter and a type of constellation rearrangement in the retransmission of the HS-DSCH, and is formed of three bits.

(6) $X_{nd}$ represents whether an HS-DSCH transmission block is a new block or a retransmission block, and is formed of one bit. If the HS-DSCH transmission block is a new block, the above H-ARQ process is not performed.

(7) $X_{ue}$ represents identification information of the mobile station, and is formed of sixteen bits.

[3] Encoding (Decoding) Process

FIG. 5 is a diagram exemplarily showing the above data flow. In FIG. 5, a numeral 100 identifies a base station (BTS: Base Transceiver Station), while a numeral 200 identifies a mobile terminal (MS: Mobile station) Note that the mobile terminal 200 may be referred simply as a mobile station 200.

As shown in FIG. 5, the base station 100 mainly includes, for example, a CRC adding unit 101, a turbo-encoder 102, a 1st rate-matching unit 103, a virtual IR (Virtual Incremental Redundancy) buffer 104, a 2nd rate-matching unit 105 and a physical CH (channel) mapping unit 106.

In thus configured base station 100, transmission data addressed to the mobile station 200 is input to the CRC adding unit 101, and the unit 101 adds a CRC code for a CRC process thereto. Then, the transmission data is input to the turbo-encoder 102, and the turbo-encoder 102 performs an error correction encoding process (a turbo-encoding process in this case) therefor.

For the turbo-encoded transmission data, the 1st rate-matching unit 103 performs a puncture (thinning) process for deleting a predetermined bit(s) using a predetermined algorithm or a repetition process for repeating a predetermined bit(s). In this case, the data will be processed to a data amount suitable for a predetermined area of the virtual IR buffer 104 in the following stage. Then, the data is temporarily held in the virtual IR buffer 104 for timing adjustment.

After that, the 2nd rate-matching unit 105 performs the puncture or repetition process for the transmission data sent from the virtual IR buffer 104 in such a way that the data can be contained in one sub-frame of the physical channel that is a target channel for mapping (assignment) performed by the physical CH mapping unit 106 in the following stage. As a result, the data can be input to the physical CH mapping unit 106.

The physical CH mapping unit 106 maps the transmission data whose data amount has been adjusted by the 2nd rate-matching unit 105. Then, the transmission data is sent to the mobile station 200 through a non-illustrated transmission antenna.

The mobile station 200 mainly includes, for example, a physical CH (channel) separating unit 107, a 2nd rate-matching unit 108, a virtual IR buffer 109, a 1st rate-dematching unit 110, a turbo-decoding unit 111 and a CRC process unit 112.

In thus configured mobile station 200, a signal sent from the base station 100 is input to the physical CH separation unit 107 through an unshown reception antenna, and the physical CH separation unit 107 identifies and demaps the received physical channel so as to extract effective data, and the extracted data is input to the 2nd rate-dematching unit 108.

For the received data, the 2nd rate-dematching unit 108 performs a rate dematching process (for adjusting the data amount) that is an opposite process of the rate matching process (the above puncture or repetition process for adjusting the data amount) performed by the 2nd rate-matching unit 105 on the receiver side (the base station 100). The received data after the rate dematching process is temporarily held in the virtual IR buffer 109 for timing adjustment, and is input to the 1st rate-dematching unit 110.

For the received data from the virtual IR buffer 109, the 1st rate-dematching unit 110 performs a rate dematching process (for adjusting the data amount) that is an opposite process of the rate matching process (the above puncture or repetition process) performed by the 2nd rate-matching unit 105 on the sender side (the base station 100).

Thus rate-dematched, received data is turbo-decoded (error correction decoded) by the turbo-decoding unit 111, and is CRC processed by the CRC process unit 112. As described above, if the CRC result is "true" (OK), an ACK signal is sent to the base station 100. On the contrary, if the CRC result is "false" (NG), an NACK signal is sent thereto.

[4] Data Demodulation/Decoding Process

FIG. 6 is a diagram showing timings of receiving the HS-SCCH and HS-DSCH and various processing timings. For simplicity of description, FIG. 6 shows only data of the process No. 1. However, the same applies to other data. In FIG. 6, the process numbers of 0 to 5 are repeated.

For example, in the slot numbers #0 to #2 in the process No. 1, the mobile station 200 receives the HS-SCCH sent from the base station 100, extracts Xue included in the first half of the HS-SCCH, and determines whether this HS-SCCH is addressed to its own mobile station 200 in the slot number #1 in the process No. 1. If it is determined that the HS-SCCH is addressed to its own mobile station 200, the mobile station 200 extracts HS-DSCH demodulation parameters (such as a modulation procedure parameter, a code multiplexing number parameter, etc.) and HS-DSCH decoding parameters (such as a transport block size parameter, a rate matching parameter, etc.) from the last half of the received HS-SCCH. In the slot number #0 of the process No. 2, the mobile station 200 performs demodulation setting and decoding setting for the HS-DSCH that is received with a delay of two slots since the HS-SCCH is received.

If the HS-DSCH is received with a delay of two slots since the HS-SCCH begins to be received (i.e. from the slot number #2 of the process No. 1 to the slot number #1 of the process No. 2), the mobile station 200 performs a process for demodulating the received HS-DSCH in accordance with the HS-DSCH demodulation setting, in the slot number #0 of the new process No. 3. Then, the turbo-decoding unit 111 performs a process for decoding the received HS-DSCH, in accordance with the HS-DSCH decoding setting.

At this time, if the CRC result of the decoded HS-DSCH is "true", as checked by the CRC process unit 112, the mobile station 200 sends an ACK signal to the base station 100. On the contrary, if the CRC result of the decoded HS-DSCH is not "true", the mobile station 200 sends a NACK signal to the base station 100, and requests for retransmission of the HS-DSCH. After that, the mobile station 200 performs a process for synthesizing retransmission data from the base station 100 with the data held in the virtual IR buffer 109 (H-ARQ synthesizing).

[5] H-ARQ Synthesizing Process

FIG. 7A is a diagram for explaining an H-ARQ process when retransmission data is appropriately received. FIG. 7B is a diagram for explaining an H-ARQ process when retransmission data is not appropriately received. In this case also, the process numbers of 0 to 5 are repeated.

Description will now be made to the case where the mobile station 200 appropriately receives the retransmission data from the base station 100 as shown in FIG. 7A.

Upon reception of the HS-DSCH data of the process No. 0, the demodulation/decoding process and the CRC process is performed for the receive data in the mobile station 200. When the CRC process unit 112 determines that the CRC result is "false", the mobile station 200 sends a NACK signal to the base station 100 through the HS-DPCCH at timing after 7.5 slots since the complete reception of the HS-DSCH (i.e. at a timing corresponding to the 1.5 slots of the process No. 3).

Upon reception of the NACK signal, the base station 100 retransmits transmission data (retransmission data of the process No. 0) whose rate matching pattern has been changed through the HS-DSCH. The mobile station 200 synthesizes the received data held in the virtual IR buffer 109 with the retransmission data at the same timing of the process No. 0 as that of the next cycle, and performs a turbo-decoding process therefor. Note that the H-ARQ synthesizing process is performed for the data received in the process No. 1, as illustrated with the dotted lines of FIG. 7A.

In this manner, in the mobile station 200 in the HSDPA, the received HS-DSCH data is synthesized with the retransmission data at a processing timing (cycle) of the same processing number. As a result, corresponding HS-DSCH data pieces can be synthesized without identifying which received data corresponds to the retransmission data using any special process. The base station 100 can send a next new packet before receiving the ACK or NACK signal from the base station 200, thus preventing a decrease in the transmission efficiency and realizing accurate synthesizing process.

[6] Problem at the Time of Receiving Data

Due to deterioration of a transmission environment between the base station 100 and the mobile station 200, the base station 100 may not appropriately receive the NACK signal, the base station 100 may not send retransmission data (retransmission data of the process No. 0 in this case), or the mobile station 200 may not receive the retransmission data.

As shown in FIG. 7B, it is assumed that the mobile station 200 can not receive the retransmission data of the process No. 0.

In this case, the mobile station 200 does not perform the synthesizing process at a timing corresponding to the process No. 0 in which the retransmission data should originally be synthesized. Instead, the mobile station 200 performs the synthesizing process at a timing corresponding to the same process No. 0 in which the retransmission data has appropriately been received. When a time period until retransmission data can appropriately be received is greater than a predetermined threshold value, the transmission data may not be subject to the synthesizing process.

In FIG. 7B, because the retransmission data can appropriately be received, data corresponding to the process No. 1 can be synthesized with the retransmission data at the timing of the process No. 1 of the next cycle, as in the case of FIG. 7A.

With reference to FIG. 8, description will now be made to control processing for a transmission using CQI (s). FIG. 8 shows a CQI mapping table which holds CQIs in association with transport block size parameters, code multiplexing number (1 to 5) parameters and modulation procedure (QPSK, 16-QAM) parameters.

The base station 100 changes the format of the HS-DSCH so as to make the format correspond to a transmission parameter corresponding to the CQI value stored in the CQI mapping table, and sends the data. In regard to the relationship between the CQI values and the total amount of data, the lower the CQI value is, the smaller the total amount of data becomes. In addition, the higher the CQI value is, the lager the total amount of data becomes.

When the base station 100 sends data through the HS-SCCH or DSCH, the transmission power value is always constant. However, depending on the positional relationship (distance, etc.) between the base station 100 and the mobile station 200, different apparent transmission power values are identified by a plurality of mobile stations 200. An SIR is generally used as an indicator indicating the transmission power from the base station 100 identified at the mobile station 200. For example, when the mobile station 200 exists near the base station 100, the SIR is high. On the contrary, when the mobile station 200 exists far from the base station 100, the SIR is low.

To improve the communication efficiency, the mobile station 200 sends a high CQI value to the base station 100, when a high SIR is identified. As a result, a large amount of transmission data is sent from the base station 100. On the contrary, when a low SIR is identified, the mobile station 200 sends a low CQI value to the base station 100. As a result, a small amount of transmission data is sent from the base station 100, thus surely sending/receiving the data.

That is, in the context of the same transmission power value (SIR), the lower the CQI value is, the lesser the error occurs (BLER (Block Error Rate) is improved (i.e. low)). On the contrary, the higher the CQI value is, the more the error occurs (the BLER is high).

In consideration of the above, according to the basic specifications of the 3GPP, it is defined that CQI values are sent to the base station 100 in the Static environment (where there is no fading). In this case, specifically, a CQI value corresponds to the transport block size, the code multiplexing number and the modulation procedure. This CQI value is so selected that the BLER of the HS-DSCH measured by the mobile station 200 is not greater than 10% (i.e. BLER<0.1).

Further, there is such a relationship as shown in the following equation (1) between the transmission power value ($P_{HS\text{-}DSCH}$) of the HS-DSCH and the transmission power value ($P_{CPICH}$) of the CPICH.

$$P_{HS\text{-}DSCH} = P_{CPICH} + \Gamma \text{ ($\Gamma$: a fixed value specified in high-order)} \quad (1)$$

As seen from this equation (1), there is a correlation between the power value of the HS-DSCH and the power value of the CPICH. When the SIR of the CPICH is high, both of the quality of the HS-DSCH and the BLER are improved. On the contrary, when the SIR of the CPICH is low, the BLER of the HS-DSCH is degraded.

According to an actual transmission parameter controlling method using the CQI values, such an SIR that the BLER is equal to 0.1 (BLER=0.1) in the static environment is searched in advance, based on each transmission parameter in association with each CQI value of the CQI mapping table (the transport block size parameter, the code multiplexing number, the modulation procedure, etc.). The CQI value and the searched an SIR are held in association with each other in a table.

The mobile station 200 measures each SIR, searches the mapping table for a CQI value corresponding to the measured SIR, and sends the value to the base station 100. Then, the base station 100 sends transmission data having a transport block size as large a size as possible (equal to or smaller than any of the transport block sizes acquired from the CQI mapping table), to the mobile station 200 through the HS-DSCH.

According to the above-described conventional techniques, the HS-SCCH is decoded so as to extract various parameters. Then, the HS-DSCH is demodulated and decoded using the extracted parameters. At this time, the HS-SCCH is convolution codes so as to be decoded. On the other hand, the HS-DSCH is turbo-encoded so as to be demodulated and decoded. This is because the data to be transmitted through the HS-SCCH has a relatively short bit length, and the data to be transmitted through the HS-DSCH has various bit lengths.

Since the data to be transmitted through the HS-DSCH has various bit lengths, the "ratio before and after the rate matching" changes. Therefore, either good or bad transmission (reception) characteristics may be realized (as described above, the lower the "ratio before and after the rate matching" is, the favorable reception characteristics may possibly be realized).

Since the data to be transmitted through the HS-SCCH has a constant bit length, the "ratio before and after the rate matching" does not change.

In such an environment that the "ratio before and after the rate matching" of the HS-DSCH is better (lower) than that of the HS-SCCH, the HS-DSCH can appropriately be received (i.e. the CRC result is "true" when the data is received and decoded). However, the HS-SCCH may not appropriately be received (i.e. the CRC result is "false" when the data is received and decoded). That is, generally, channels are so assigned that reception characteristics are better in the HS-SCCH than the case of the HS-DSCH. Depending on the encoding procedure of corresponding channel data or rate matching process, the good/bad reception characteristics of both of the HS-SCCH and HS-DSCH may become the other way around.

Even if the HS-DSCH, corresponding to the HS-SCCH whose CRC result is "false", can appropriately be received, the receiving process for the HS-DSCH itself can not be carried out. This may result in a problem of deterioration in the transmission efficiency.

SUMMARY OF THE INVENTION

The present invention has been made in consideration of the above problem. It is accordingly an object of this invention to prevent deterioration of transmission efficiency by enabling the reception of one channel (second channel), even if the other channel (first channel) can not appropriately be received, in an HSDPA transmission system where information regarding a receiving process for the second channel is transmitted through the first channel.

To accomplish the above object, the present invention adopts a mobile terminal and a method of controlling reception of the terminal as follows.

(1) According to the present invention, a mobile terminal is characterized by comprising: first channel receiving processing means for performing a receiving process for a first channel from a base station and acquiring information regarding a receiving process for a second channel from the base station; second channel receiving processing means for performing the receiving process for the second channel, using the information acquired by the first channel receiving processing means; holding means for holding the information acquired by the first channel receiving processing means; and reception controlling means for controlling each of the channel receiving processing means and the holding means in such a way that the second channel receiving processing means performs a receiving process for a newly received second channel, using the information held in the holding means.

(2) The reception controlling means may perform the controlling in such a way that the second channel receiving processing means performs the receiving process based on a timing determined in accordance with a result of past receiving process performed by the first channel receiving processing means.

(3) The holding means may be formed as a reception quality information holding unit which holds reception quality information sent to the base station as information regarding the receiving process, the reception quality information changing in accordance with reception quality with respect to the base station and corresponding to information regarding the receiving process; and the reception controlling means may comprise a table which keeps the information regarding the receiving process and the reception quality information in association with each other, and a controlling unit which acquires the information regarding the receiving process in association with the reception quality information held in the holding means from the table, and outputs the acquired information as information to be used for the receiving process performed by the second channel receiving processing means.

(4) The reception controlling means may include a reception quality measuring unit which measures reception quality with respect to the base station, and a reception quality determining unit which determines whether a result of measurement performed by the reception quality measuring unit is equal to or lower than a predetermined threshold value; and the controlling unit may output the information regarding the receiving process to the second channel receiving processing means, when the reception quality determining unit determines that the measurement result is equal to or lower than the threshold value.

(5) The reception controlling means may include a first channel receiving processing stopping controlling unit which stops the receiving process performed by the first channel receiving processing means, when the reception quality determining unit determines that the measurement result is equal to or lower than the threshold value.

(6) The reception controlling means may control each of the channel receiving processing means and the holding means in such a way that the second channel receiving processing means performs a receiving process for a newly received second channel using the information acquired by the first channel receiving processing means, when the reception quality determining unit determines that the measurement result is greater than the threshold value.

(7) The reception controlling means may include a negotiation controlling unit which negotiates with the base station in advance about a corresponding set of the information regarding the receiving process and the reception quality information in association with each other.

(8) According to the present invention, a method of controlling reception of a mobile terminal is characterized by comprising: a first channel reception processing step of performing a receiving process for a first channel from a base station and acquiring information regarding a receiving process for a second channel from the base station; a second channel reception processing step of performing the receiving process for the second channel, using the information acquired in the first channel reception processing step; a holding step of holding the information acquired in the first channel reception processing step; and a reception controlling step of controlling each of the channel reception processing steps and the holding step in such a way that a receiving process for a newly received second channel is performed using the information held in the holding step.

(9) The reception controlling step may include a step of performing the controlling in such a way that the receiving process is performed in the second channel reception processing step, based on a timing determined in accordance with a result of past receiving process performed by the first channel reception processing step.

(10) The holding step may include a step of holding reception quality information as information regarding the receiving process, the reception quality information being sent to the base station and changing in accordance with reception quality with respect to the base station and corresponding to the information regarding the receiving process; and the reception controlling step may include a step of acquiring the information regarding the receiving process and corresponding to the reception quality information held in the holding step, from a table keeping the information regarding the receiving process in association with the reception quality information, and using the acquired information in the receiving process for the second channel reception processing step.

According to the above-described present invention, at least any one of the following effects or advantages can be obtained.

(1) The mobile station holds information (hereinafter referred simply as a "parameter" regarding a receiving process for a second channel extracted from a first channel, and performs the receiving process for the second channel using the held parameter(s). Thus, even if the first channel fails to be received, the receiving process for the newly received second channel (this time) can be performed using the extracted parameter, thus preventing a failure in receiving the second channel, improving the data reception efficiency of the second channel, and preventing deterioration of the transmission efficiency of the system as a whole.

(2) The mobile terminal performs the receiving process for the second channel based on a timing determined in accordance with a result of the previously-received first channel. Therefore, even if the first channel can not be received, the receiving process for the second channel can be performed appropriately at an appropriate timing, without requesting to perform any special timing setting process.

(3) Further, the mobile terminal can manage any parameters necessary for the receiving process for the second channel with a smaller amount of memory, using a table holding reception quality information sent to the base station and the parameter in association with each other, and holding only the reception quality information in the holding means (reception quality information holding unit).

(4) The mobile terminal measures reception quality with respect to the base station, and compares the measured result with a predetermined threshold value. When the measured result is equal to or lower than the threshold value, the mobile terminal performs the receiving process for the second channel using the held parameters. When the measured result is not equal to or lower than the value, the mobile terminal performs the usual receiving process for the second channel (i.e. selectively performs the receiving process based on the past parameters and the usual receiving process). In this case, a receiving process can be adopted appropriately in accordance with the communication context between the mobile terminal and the base station, thus further improving the reception characteristics (transmission efficiency).

(5) Further, the mobile terminal can stop the receiving process for the first channel, when the measured result is equal to or lower than the threshold value. In this case, the power is not supplied to the first channel receiving processing means, thus reducing consumption power.

(6) The mobile terminal can negotiate with the base station about a corresponding set of the information regarding the receiving process and the reception quality information in association with each other. Even if the base station sends the first channel, using the information regarding the receiving process corresponding to the reception quality information equal to or lower than the reception quality information, the first channel is prevented from being sent using such information, and, surely, the second channel does not fail to be received.

BRIEF DESCRIPTION OF THE DRAWINGS

FIG. 6 is a timing chart for explaining a conventional reception control method;

FIG. 7A is a diagram for explaining an H-ARQ process when retransmission data has appropriately been received;

FIG. 7B is a diagram for explaining an H-ARQ process when retransmission data has not been received;

FIG. 8 is a diagram showing a CGI mapping table; and

DETAILED DESCRIPTION OF THE PREFERRED EMBODIMENT

A preferred embodiment of the present invention will now be described with reference to the drawings.

[A] Description of One Embodiment

Figure 1:
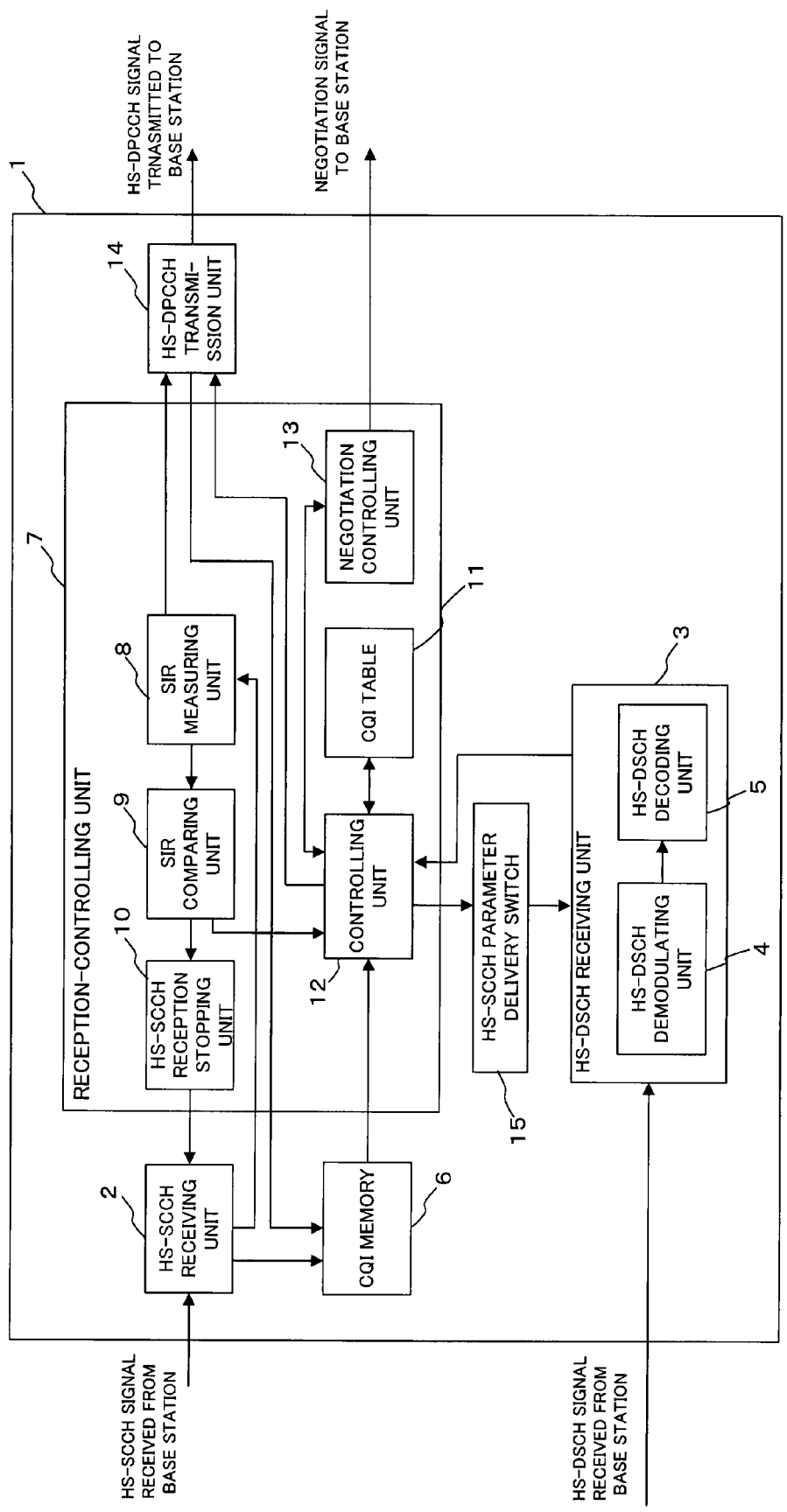
FIG. 1 is a block diagram showing the main part of a mobile terminal (a mobile station) according to one embodiment of the present invention.

FIG. 1 is a block diagram showing the configuration of the main part of a mobile terminal (hereinafter referred to as a mobile station) according to one embodiment of the present invention. In FIG. 1, the mobile station 1 communicates with a base station (BTS, not shown) by wireless (through a downlink in the HSDPA system). The mobile station 1 comprises, for example, an HS-SCCH receiving unit 2, an HS-DSCH receiving unit 3, a CQI memory 6, a reception-controlling unit 7, an HS-DPCCH transmission unit 14 and an HS-SCCH parameter delivery switch 15.

The HS-SCCH receiving unit (first channel receiving processing means) 2 is to perform a receiving process (demodulating, decoding, etc.) for an HS-SCCH (first channel) serving as a control channel) that is sent from the base station (hereinafter referred to as a base station). Specifically, the HS-SCCH receiving unit 2 demodulates and decodes a received signal of the HS-SCCH, and obtains its decoded result. From this decoded result, the unit 2 can extract (acquire) information (a process number parameter, a retransmission/new indicator parameter, a transport block size parameter, a code multiplexing number parameter, a modulation procedure parameter and a rate matching parameter) necessary for receiving process (demodulating, decoding, etc.) for an HS-DSCH (a second channel) serving as a data channel.

The HS-DSCH receiving unit 3 is to perform a receiving process for a received signal of the HS-DSCH from the base station, using the parameters extracted by the HS-SCCH receiving unit 2. To satisfactorily perform this receiving process, the unit 3 includes an HS-DSCH demodulating unit 4 and an HS-DSCH decoding unit 5.

The HS-DSCH demodulating unit 4 is to perform a demodulating process for a received signal of the HS-DSCH, using, for example, these parameters regarding the modulation procedure and code multiplexing number. The HS-DSCH decoding unit 5 is to perform a decoding process for a received signal of the HS-DSCH, using, for example, these parameters regarding the process number, retransmission/new indicator, transport block size and rate matching receiving process.

The HS-DPCCH transmission unit 14 sends an ACK signal to the base station through the HS-DPCCH, if the HS-DSCH signal is appropriately received (e.g. a CRC result) by the HS-DSCH receiving unit 3 (OK). On the contrary, the unit 14 sends a NACK signal to the base station, if the signal is not appropriately received (NG). Further, the unit 14 sends a CQI corresponding to a received result of an HS-SCCH SIR that is measured by an SIR measuring unit 8 (as will be described later) to the base station through the HS-DPCCH.

The CQI memory (holding means; reception quality information holding unit) 6 is to hold a CQI value (CQI report value) sent (feed back) to the base station by the HS-DPCCH transmission unit 14, as reception quality information. A CQI table 11 is a component part of the reception-controlling unit 7. As shown in FIG. 8, the table 11 is to hold data including a predetermined range of CQI values and various parameters (e.g. a transport block size parameter, a code multiplexing number parameter, a modulation procedure parameter) in association with each other in the form of a mapping table. The data can be kept in a predetermined storage device (may be provided exclusively for the CQI memory 6, CQI table 11, etc., or may be shared within the mobile station 1).

In this example, the CQI table 11 is so prepared that it simply holds information (the CQI report value) held in association with various parameters in advance, without keeping these parameters per se in the CQI memory 6. Note that such parameters change in accordance with the CQI report values (i.e. the parameters change in accordance with the reception quality (SIR) of the signal transmitted to/from the base station). As a result, the CQI memory 6 has such a configuration as if it holds the above-described parameters, though the memory 6 has only a minimum capacity. Note that the CQI memory 6 may hold those parameters per se instead of the CQI values (i.e. the CQI table 11 is not necessary in this case). However, it is preferred that only the CQI values be held as in this example, thereby not requiring a large memory capacity.

The HS-SCCH parameter delivery switch 15 selectively delivers, to the HS-DSCH receiving unit 3, parameters as information necessary for the receiving process for data of the HS-DSCH (the demodulating and decoding process). Such parameters include parameters obtained as a result of the receiving process (the demodulating and decoding process) for the signal of the HS-SCCH received by the HS-SCCH receiving unit 2 and also parameters held in the CQI table 11 based on the CQI report values. As will be explained later, the selective delivery of the parameters is performed based on a result of a process for comparing (and determining) a predetermined threshold value with the reception quality (SIR value) in the signal transmitted between the mobile station 1 and the base station, under the control of the SIR measuring unit 8, an SIR comparing unit 9 and a controlling unit 12.

Specifically, in this example, if the SIR value of the signal transmitted between the mobile station 1 and the base station is greater than the predetermined threshold value, the parameters obtained from the HS-SCCH receiving unit 2 are delivered to the HS-DSCH receiving unit 3. On the contrary, if the SIR value therebetween is not greater than the predetermined threshold value, past HS-SCCH decoding results (parameters) corresponding to the CQI values held in the CQI memory 6 are delivered to the HS-DSCH receiving unit 3.

The reception-controlling unit 7 is to control the receiving process for at least the HS-SCCH and HS-DSCH. In this example, the unit 7 includes not only the CQI table 11, but also the SIR measuring unit 8, the SIR comparing unit 9, an HS-SCCH reception stopping unit 10, the controlling unit 12 and a negotiation controlling unit 13 as shown in FIG. 1.

The SIR measuring unit (reception quality measuring unit) 8 is to measure the reception quality of a transmission signal between the mobile station 1 and the base station. For example, the unit 8 measures the SIR of the HS-SCCH signal received by the HS-SCCH receiving unit 2, as the reception quality information. Note that the SIR measuring unit 8 can also measure the SIR of the received HS-DSCH signal as the reception quality information.

The SIR comparing unit 9 is to compare and determine whether an SIR measured by the SIR measuring unit 8 is equal to or lower than a predetermined threshold value. In this example, if the SIR is equal to or lower than the threshold value, the HS-SCCH reception stopping unit 10 stops the HS-SCCH receiving process which is performed by the HS-SCCH receiving unit 2.

As a result of the comparison performed by the SIR comparing unit 9, when the measured SIR is equal to or lower than the threshold value, the HS-SCCH reception stopping unit 10 stops the receiving process for the HS-SCCH receiving unit 2. This is because the HS-DSCH receiving unit 3 executes the receiving process based on the past HS-SCCH decoding results (parameters) corresponding to the CQI values held in the CQI memory 6. (That is, the results of the received and decoded HS-SCCH to be newly received (this time) are not necessary.) On the contrary, if the measured SIR is not equal to or lower than threshold value, the HS-SCCH reception stopping unit 10 controls a receiving process to be usually executed by the HS-SCCH receiving unit 2 (i.e. a receiving process executed by the HS-SCCH receiving unit 2, using the received HS-SCCH decoding results (parameters) (this time)). Note that it is possible to stop supplying the power to the HS-SCCH receiving unit 2 when the receiving process for the HS-SCCH receiving unit 2 is stopped, thus reducing power consumption.

The controlling unit 12 includes the standard functions of the HSDPA system for providing the HS-DPCCH transmission unit 14 with a result of the received process (CRC result: OK/NG) performed by the HS-DSCH receiving unit 3 so as to generate and send an ACK/NACK signal. In addition, the controlling unit 12 controls at least the HS-SCCH receiving unit 2, the HS-DSCH receiving unit 3, the CQI memory 6 and the HS-DPCCH transmission unit 14, thereby controlling the receiving process (operational mode) for the HS-SCCH and HS-DSCH. That is, the controlling unit 12 selectively controls a normal HS-DSCH receiving process (referred to as a "normal mode") using the parameters obtained from the newly-received HS-SCCH (this time) and the HS-DSCH receiving process (referred to as a "past parameter operational mode") using the past parameters corresponding to the CQI values held in the CQI memory 6. For such processing, the unit 12 includes, for example, the functions as follows.

(1) Mode setting function in which, if the SIR measuring unit 9 determines that the SIR is equal or lower than the threshold value, the unit 12 sets the receiving process for the HS-DSCH receiving unit 3 into the past parameter operational mode. On the other hand, if the SIR measuring unit 9 determines that the SIR is not equal to or lower than the threshold value, the unit 12 sets the receiving process for the HS-DSCH receiving unit 3 into the normal mode.

(2) Parameter lookup function in which, in the past parameter operational mode, the unit 12 looks up (searches for) parameters corresponding to the CQI values held in the CQI memory 6 from the CQI table 11.

(3) Parameter transfer function in which the unit 12 provides the HS-DSCH receiving unit 3 with the parameters obtained from the newly-received HS-SCCH in the normal mode and the past parameters obtained from the CQI table 11 in the past parameter operational mode, for the receiving process for the HS-DSCH.

(4) HS-SCCH reception stopping control function in which the unit 12 controls the HS-SCCH reception stopping unit 10 to stop the receiving process for the HS-SCCH in the past parameter operational mode.

(5) Process number informing function in which the unit 12 detects a receiving process timing (the periodic process number) of the HS-DSCH that corresponds to the receiving process by the HS-DSCH receiving unit 3, from receiving process result (process number) of the successful past reception (demodulating, decoding, etc.) by the HS-SCCH receiving unit 2. Further, the unit 12 provides (informs) the HS-DSCH receiving unit 3 with the detected receiving process timing.

Note that the above (4) HS-SCCH reception stopping control function is provided for the purpose of stopping the supply of power to the HS-SCCH receiving unit 2 in the past parameter operational mode so as to reduce power consumption. Thus, the function of (4) is not a requisite (i.e. an optional matter).

The negotiation controlling unit 13 sends a CQI report value to the base station. In response to this CQI report value, the unit 13 and the base station makes an arrangement (negotiation) for the receiving process. The base station informs the mobile station 1 about the arrangement through the HS-SCCH. The base station may send the HS-SCCH using at least one parameter corresponding to any CQI value equal to or lower than the CQI report value. That is, the CQI report value may not correspond to the parameter held in the CQI table 11. The negotiation controlling unit 13 is provided so as to prevent a failure in receiving the HS-DSCH, and thus is not a requisite (i.e. an optional matter).

Figure 2:
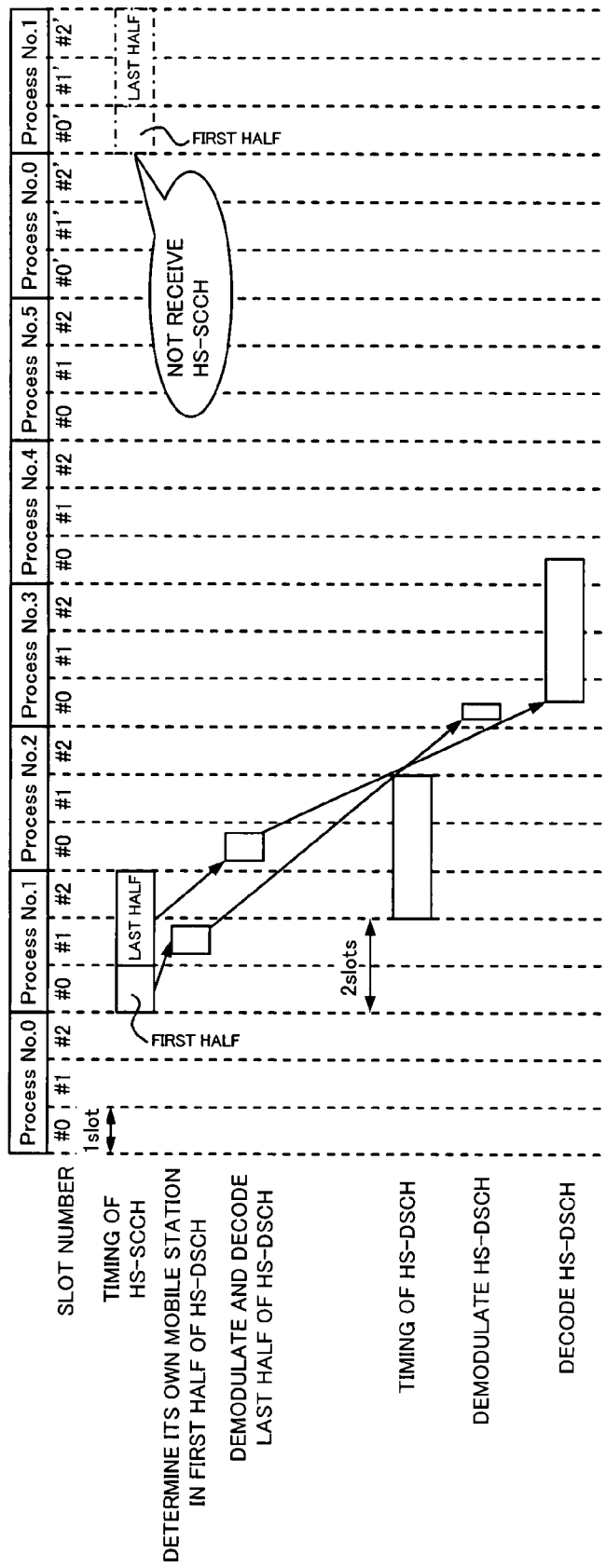
FIG. 2 is a timing chart for explaining a reception control method according to one embodiment of the present invention.
Figure 3:
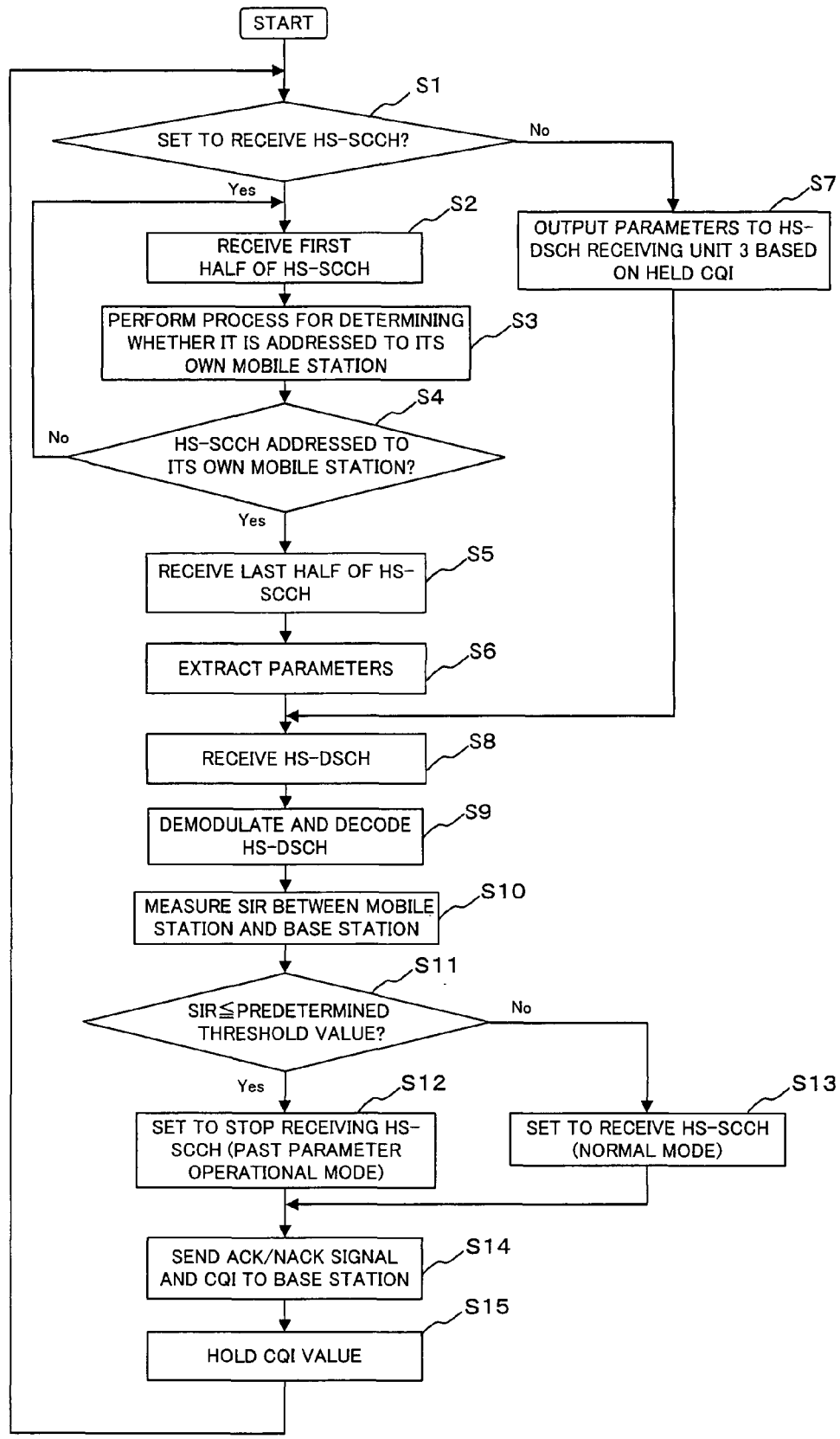
FIG. 3 is a flowchart for explaining the reception control method according to one embodiment of the present invention.
Figure 4:
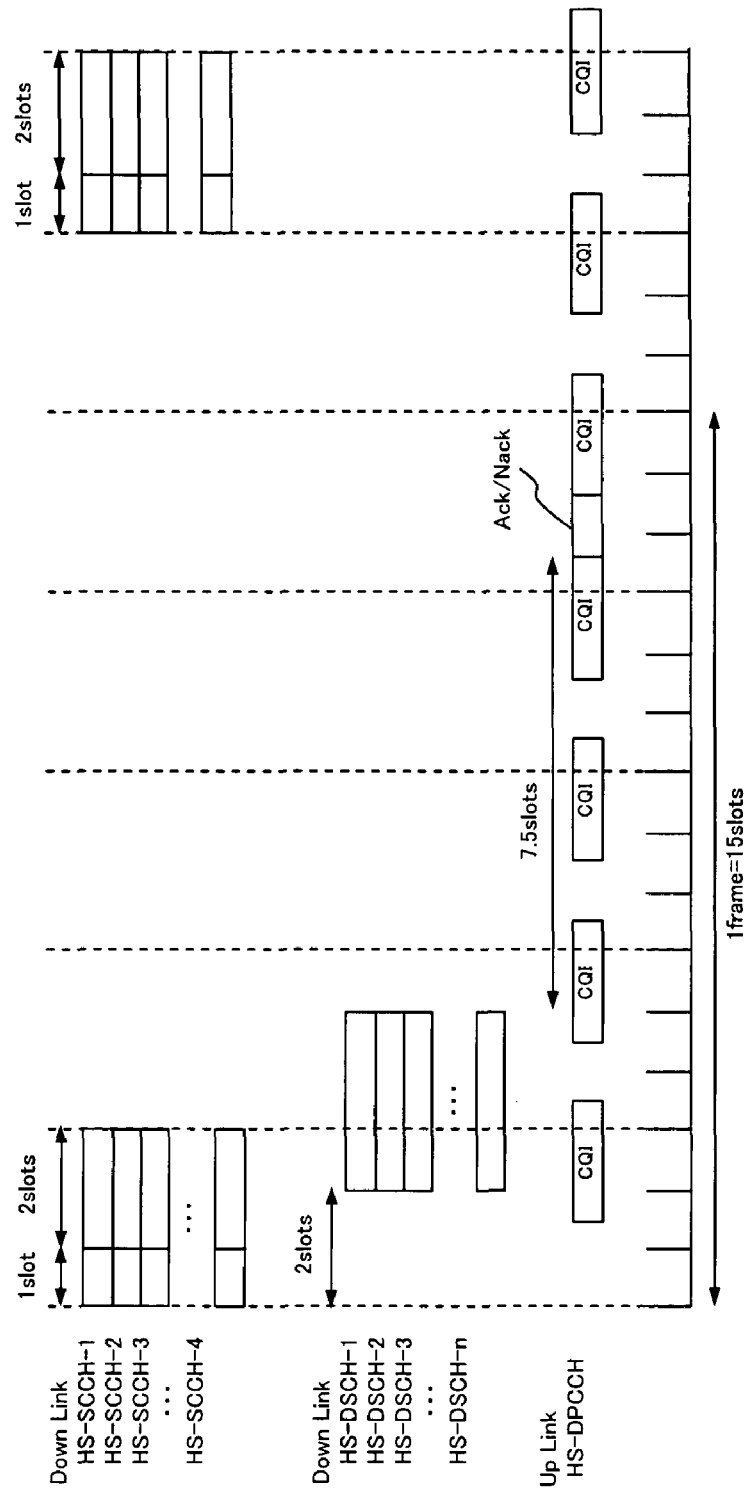
FIG. 4 is a diagram showing a channel configuration in an HSDPA system.
Figure 5:
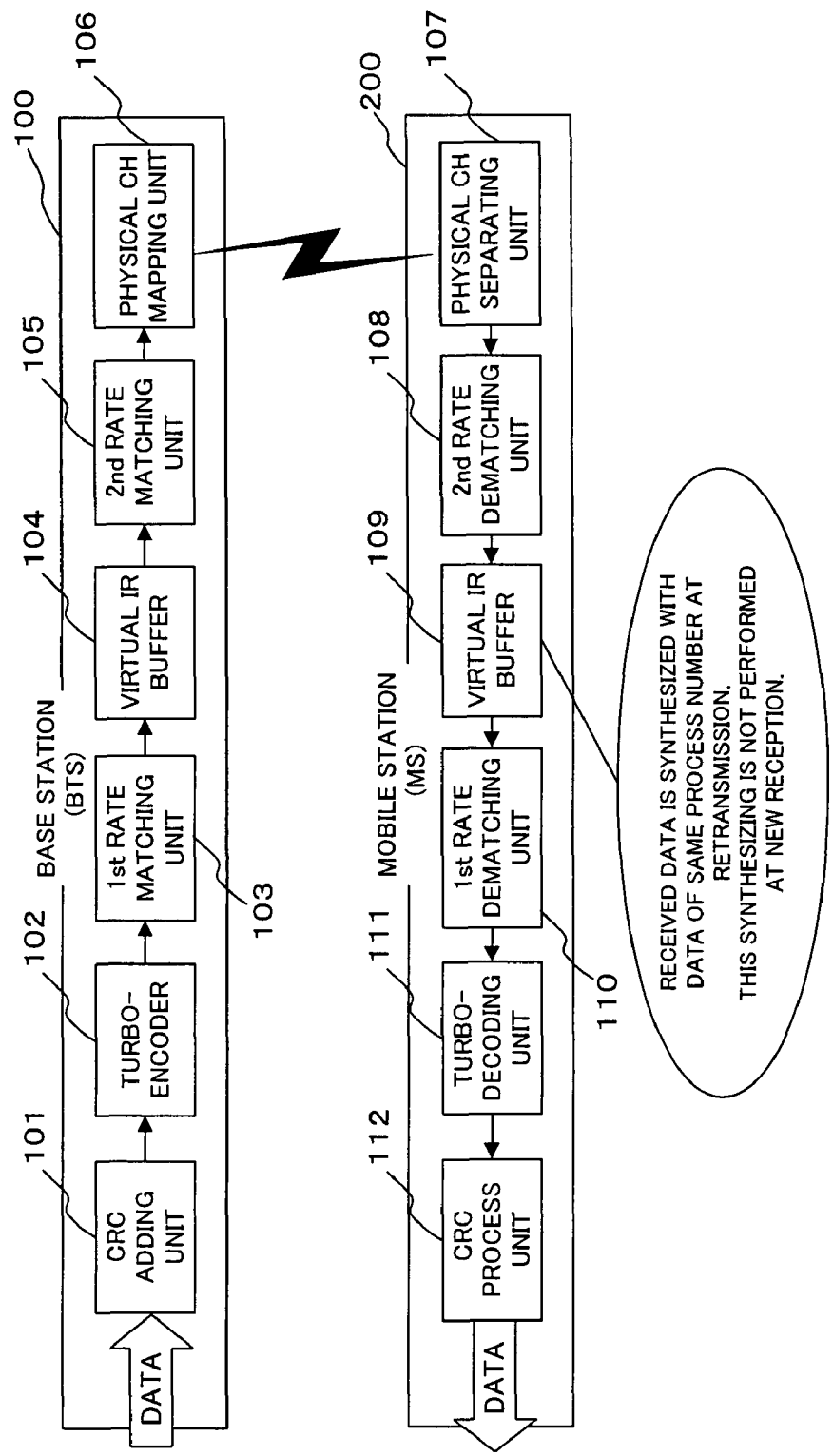
FIG. 5 is a block diagram for explaining a conventional transmission process in a base station and a receiving process in the mobile terminal.
Figure 9:
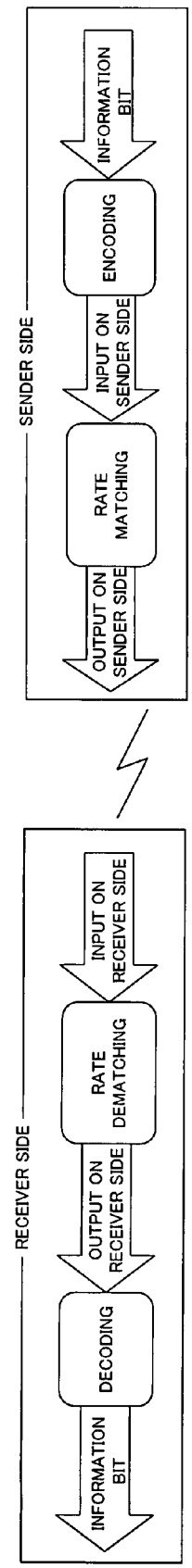
FIG. 9 is a diagram for exemplarily showing the operation on the receiver and sender sides in the HSDPA system.

The below describes operations of the mobile station (a reception control method) according to this embodiment with reference to FIG. 2 and FIG. 3. FIG. 2 is a timing chart showing receiving process timings for the HS-SCCH and HS-DSCH. FIG. 3 is a flowchart showing the processing flow of the reception control method. For simplicity of description, only the received data of process No. 1 will hereinafter be described. However, the same reception controlling can be performed for the received data of any other process number.

The reception-controlling unit 7 determines whether the HS-SCCH receiving unit 2 is set to perform the receiving process for the HS-SCCH, before starting the receiving process for the receive data of the process No. 1 (i.e. determines whether the operational mode is the normal mode or past parameter operational mode) (Step S1 of FIG. 3).

If it is determined the HS-SCCH receiving unit 2 is set to perform the receiving process for the HS-SCCH (i.e. normal mode) (Yes in Step S1 of FIG. 3), the HS-SCCH receiving unit 2 receives HS-SCCH that is sent from the base station in slot numbers #0 to #2 of the process No. 1 in FIG. 2 (Step S2 of FIG. 3). Further, the unit 2 extracts Xue included in the first half of the HS-SCCH, and determines whether this HS-SCCH is addressed to its own mobile station 1 in the slot number "1" of the process No. 1 (Steps S3 and S4 of FIG. 3).

If it is determined that the HS-SCCH is addressed to its own mobile station 1 (Yes in Step S4 of FIG. 3) the HS-SCCH receiving unit 2 extracts HS-DSCH demodulation parameters (including a modulation procedure parameter, a code multiplexing number parameter, etc.) and HS-DSCH decoding parameters (including a transport block size parameter, a rate matching parameter, etc.) (Steps S5 and S6 of FIG. 3), from the last half part of the received HS-SCCH. Then, the HS-SCCH receiving unit 2 performs demodulation and decoding settings for the HS-DSCH received with a delay of two slots since the HS-SCCH data is received, in the slot number #0 of the process No. 2. Thus extracted parameters are held in the memory 6. On the contrary, if it is determined that the HS-SCCH is not addressed to its own mobile station 1 (No in Step S4 of FIG. 3), the HS-SCCH receiving unit 2 does not perform the receiving process for the last half of the HS-SCCH and corresponding HS-DSCH (Steps S2 to S4 of FIG. 3).

If the HS-DSCH data is received by the HS-DSCH receiving unit 3 with a delay of two slots since the HS-SCCH data begins to be received (i.e. in the slot number #2 of the process No. 1 to the slot number #1 of the process No. 2 as shown in FIG. 2) (Step S8 of FIG. 3), the reception-controlling unit 7 (controlling unit 12) controls the HS-SCCH parameter delivery switch 15 to deliver parameters extracted from the HS-SCCH newly received by the HS-SCCH receiving unit 2 to the HS-DSCH receiving unit 3 in the normal mode. Then, the HS-DSCH receiving 3 performs a demodulation process for the received HS-DSCH in the slot number #0 of the next process No. 3, and performs a decoding process for the received HS-DSCH in the slot number #0 of the process No. 3 to the slot number #0 of the process No. 4, in accordance with the parameters (Step S9 of FIG. 3).

Accordingly, the HS-DSCH receiving unit 3 receives the parameters extracted from the HS-SCCH newly received by the HS-SCCH receiving unit 2, using the parameter transfer function of the HS-SCCH parameter delivery switch 15 so as to perform a receiving process for corresponding HS-DSCH, in the normal mode of this example.

After that, the SIR measuring unit 8 measures an SIR of the HS-SCCH signal received by the HS-SCCH receiving unit 2 as reception quality between the mobile station 1 and the base station (Step S10 of FIG. 3). Further, the SIR comparing unit 9 compares and determines whether the SIR measured by the SIR measuring unit 8 is equal to or lower than a predetermined threshold value (Step S11 of FIG. 3).

If it is determined that the measured SIR is greater than the predetermined threshold value (No in Step S11 of FIG. 3), the reception-controlling unit 7 (controlling unit 12) sets the operational mode of the HS-SCCH reception stopping unit 10 into a normal mode so as to perform the HS-SCCH and HS-DSCH receiving processes in the same way as before (Step S13 of FIG. 3). That is, the controlling unit 7 controls the HS-SCCH receiving unit 2 to perform the primary receiving process (i.e. a process for newly receiving HS-SCCH using decoded results (parameters)).

On the contrary, if it is determined that the measured SIR is equal to or lower than the predetermined threshold value (Yes in Step S11 of FIG. 3), the reception-controlling unit 7 (controlling unit 12) sets the operational mode to the past parameter operational mode, and stops the HS-SCCH receiving process for the HS-SCCH receiving unit 2 using the HS-SCCH reception stopping control function (Step S12 of FIG. 3).

At this time, the reception-controlling unit 7 (controlling unit 12) controls the HS-SCCH parameter delivery switch 15 to deliver the past decoded HS-SCCH results (parameters) corresponding to the CQI values held in the CQI memory 6 to the HS-DSCH receiving unit 3. Then, the HS-DSCH receiving unit 3 performs the receiving process for the HS-DSCH data based on the past decoded HS-SCCH results (parameters). In the description of the processing flow here, it is assumed that the measured SIR is equal to or lower than the predetermined threshold value, and the HS-SCCH reception stopping unit 10 stops the HS-SCCH receiving process of the HS-SCCH receiving unit 2.

A CRC process unit (not illustrated) performs a CRC process for the HS-DSCH data decoded by the HS-DSCH receiving unit 3. If the check result is "true", the HS-DPCCH transmission unit 14 sends an ACK signal to the base station. On the contrary, if the check result is "false", the unit 14 sends a NACK signal to the base station, and sends a request for retransmitting the HS-DSCH (Step S14 of FIG. 3). The HS-DPCCH transmission unit 14 controls the CQI memory 6 to hold the CQI values, based on the process for newly receiving (this time) the HS-DSCH data (Step S15 of FIG. 3).

After this, the reception-controlling unit 7 determines again whether the HS-SCCH receiving unit 2 is set to perform the receiving process for the HS-SCCH data (whether the unit is in a normal mode) (Step S1 of FIG. 3), before beginning to perform the receiving process for the next data to be received. At this time, the measured SIR between its own mobile station 1 and the base station is equal to or lower than the predetermined threshold value in the previous receiving process for the HS-SCCH (see slot numbers #0 to #2 of the process No. 1 in FIG. 2). Thus, the operational mode has already been set to the past parameter operational mode (No in Step S1 of FIG. 3).

In this case also, HS-SCCH is sent from the base station, but the HS-SCCH receiving unit 2 does not perform the receiving process for the HS-SCCH (dotted lines in the slot numbers #0' to #2' of the process No. 1 in FIG. 2).

In this manner, if the operational mode is the past parameter operational mode, the controlling unit 12 looks up and acquires parameters (necessary for demodulating and decoding the HS-DSCH) corresponding to the previous CQI values held in the CQI memory 6 from the CQI table 11 (parameter look up function).

Thus acquired past parameters are provided to the HS-DSCH receiving unit 3 so as to be used for the receiving process for the HS-DSCH, through the HS-SCCH delivery switch 15 (Step S7 of FIG. 3).

In this manner, the parameters acquired from the CQI table 11 are provided to the HS-DSCH receiving unit 3 in the past parameter operational mode of this example. Then, the unit 3 performs the receiving process for the HS-DSCH.

After that, the controlling unit 12 detects a receiving process timing for the HS-DSCH data based on the received process result (process number) of the past successful reception (demodulating and decoding) performed by the HS-SCCH receiving unit 2, and informs the HS-DSCH receiving unit 3 of the detected timing (process number informing function).

As a result, the HS-DSCH receiving unit 3 can be aware of the exact reception timing of the HS-DSCH data so as to accurately perform the receiving process for the HS-DSCH, even when the receiving process for the HS-SCCH is not appropriately performed by the HS-SCCH receiving unit 2 (i.e. the operational mode is the past parameter operational mode).

According to the above-described process number informing function, the unit 12 detects a time period in which the HS-DSCH signal is received, the HS-DPCCH data is transmitted, and then the HS-DSCH signal is received again (e.g. the cycle of six processes "0" to "5"), when the timing of receiving the HS-DSCH cannot be acquired from the result of the HS-SCCH receiving process. As a result, the timing of each process can easily be estimated.

Of those parameters, for example, the retransmission/new indicator parameter can easily be distinguished in accordance with whether the mobile station 1 has sent an ACK or NACK signal every six processes. That is, an HS-DSCH signal to be newly received (this time) can be considered as a new signal, when the ACK signal has been sent because the CRC result of the previous (six processes before) HS-DSCH receiving process was "true". On the contrary, an HS-DSCH signal to be newly received (this time) can be retransmission data, when a NACK signal has been sent because the CRC result of the previous (six processes before) HS-DSCH receiving process was "false".

In addition, of those parameters, for example, the rate matching parameter can easily be distinguished, in accordance with whether the retransmission/new indicator parameter represents the reception of the new data or retransmission data. That is, it can be understood that a system bit generally has priority over the other, when the new data will be transmitted. On the contrary, it can be understood that a system bit does not generally have priority over the other, when the retransmission data will be transmitted.

For example, at any given time, when the SIR measuring unit 9 determines that the measured SIR is greater than the predetermined threshold value, the operational mode shifts to the normal mode by the mode setting function, and the HS-SCCH receiving unit 2 restarts the HS-SCCH receiving process.

Further, though not illustrated in FIG. 3, the negotiation controlling unit 13 can negotiate with a base station in advance for the parameters (including the transport block size parameter, the demodulation procedure parameter, the code multiplexing number parameter, etc.). In this case, the parameters are to be sent to the mobile station 1 through the HS-SCCH, in response to the CQI report value sent to the base station.

Specifically, the negotiation controlling unit 13 controls the base station to uniquely determine a parameter corresponding to a CQI sent from the mobile station 1 so as to send HS-DSCH data using a DCC (Dedicated Control Channel) (i.e. to perform a CQI table fixation negotiation), before communication begins between the mobile station 1 and the base station in the HSDPA.

As a result, the base station can be prevented from sending the HS-SCCH using a parameter corresponding to any CQI value lower than the CQI report value. That is, data can be matched with the CQI table 11. Thus, it can surely be prevented that the HS-DSCH fails to be transmitted.

Accordingly, the preferred embodiment of the present invention has specifically been described. The present invention is not limited to the above embodiment, and various changes may arbitrarily be made without departing from the scope of the present invention.

For example, in the above embodiment, using the parameter look up function, the parameters are looked up using the CQI values held in the CQI memory 6 and the CQI table 11, and the looked parameters are provided to the HS-DSCH receiving unit 3. However, the parameters which are extracted from the previously-received HS-SCCH signal may be held in the CQI memory 6, and the HS-DSCH data may be received using the parameters.

When the negotiation is not performed, if the amount of data to be sent from the base station to the mobile station 1 is smaller than the transport block size corresponding to the CQI table 11, any of the transport block size parameter, modulation procedure parameter and code multiplexing number parameter may not correspond to the CQI table 11, due to a change in a communication environment (i.e. a change in the number of users in the same cell). Even in this case, there is a high probability that its format combination of the transport block size, the modulation procedure and the code multiplexing number corresponds to any of the combinations held in the CQI table 11, thus not resulting in a serious problem.

In the above embodiment, when it is determined that the measured SIR is greater than the predetermined threshold value, the operational mode is switched to the normal mode by the mode setting function, thereby enabling controlling the HS-SCCH receiving unit 2 to perform the HS-SCCH receiving process. However, when the HS-SCCH process is performed for the first time, the operational mode can be switched to the normal mode. Regardless of the measurement result of the SIR, the operational mode can periodically be switched to the normal mode (i.e. the HS-SCCH receiving unit 2 periodically performs the HS-SCCH receiving process) so as to periodically update the data contents of the CQI memory 6 or CQI table 11. As a result, the data contents of the CQI memory 6 or CQI table 11 can be highly reliable in accordance with the change in the communication condition.

In the above embodiment, the operational mode may be switched based on the measured SIR. However, the operational mode can be switched based on the ratio of the HS-DSCH data before and after the rate matching.

That is, for example, the operational mode is switched to the past parameter operational mode, only when there is a low ratio of the HS-DSCH before and after the rate matching and when the HS-DSCH data has a higher possibility of successful transmission than that of the HS-SCCH. On the contrary, the operational mode may be switched to any mode, when there is a high ratio of the HS-DSCH before and after the rate matching and when the HS-SCCH data has the same possibility of transmission failure as that of the HS-DSCH data. If the operational mode is set to the normal mode, the data contents of the CQI memory 6 or CQI table 11 can periodically be updated. If the operational mode is set to the past parameter operational mode, the HS-SCCH receiving process for the HS-SCCH receiving unit 2 stops, thus reducing the consumption power as a whole.

Note, however, a ratio of the HS-SCCH is substantially constant before and after the rate matching. If there is simply a low SIR between the base station and the mobile station 1, there is a high possibility of failure of transmitting HS-SCCH data. If not, there is a high possibility of successful transmission of the HS-SCCH. However, a ratio of the HS-DSCH decreases before and after the rate matching, when there is a low SIR between the base station and the mobile station 1 and there is a low CQI value. Thus, there is a high possibility for successful reception of the HS-DSCH. On the contrary, a ratio of the HS-DSCH increases before and after the rate matching, when there is a high SIR between the base station and the mobile station 1 and there is a high CQI value. Thus, there is a high possibility for failure in receiving the HS-DSCH.

Therefore, in such a communication environment that the SIR is relatively low and the CQI value is small, the receiving process for the HS-SCCH data is actively stopped (i.e. the operational mode is switched to the past parameter operational mode), thereby improving the transmission efficiency of the communication system.

What is claimed is:

1. A mobile terminal comprising:
    first channel receiving processing means for performing a receiving process for a first channel from a base station and acquiring information regarding a receiving process for a second channel from the base station;
    second channel receiving processing means for performing the receiving process for said second channel;
    holding means for holding reception quality information sent to said base station, said reception quality information changing in accordance with reception quality with respect to said base station and corresponding to said information regarding the receiving process; and
    reception controlling means for controlling each of said channel receiving processing means and said holding means in such a way that said second channel receiving processing means performs a receiving process for a newly received second channel,
    wherein
    said reception controlling means includes
    a table which keeps said information regarding the receiving process and said reception quality information in association with each other;
    a reception quality measuring unit which measures reception quality with respect to said base station, and
    a reception quality determining unit which determines whether a result of measurement performed by said reception quality measuring unit is equal to or lower than a predetermined threshold value; and
    a controlling unit which, if the reception quality determining unit determines the result of measurement is equal to or lower than the predetermined threshold value, acquires said information regarding the receiving process in association with the reception quality information held in said holding means from said table, and outputs the acquired information as information to be used for the receiving process performed by said second channel receiving processing means.

2. The mobile terminal according to claim 1, wherein said reception controlling means performs the controlling in such a way that said second channel receiving processing means performs the receiving process based on a timing determined in accordance with a result of past receiving process performed by said first channel receiving processing means.

3. The mobile terminal according to claim 1, wherein said reception controlling means includes
    a first channel receiving processing stopping controlling unit which stops the receiving process performed by said first channel receiving processing means, when said reception quality determining unit determines that the measurement result is equal to or lower than the threshold value.

4. The mobile terminal according to claim 2, wherein said reception controlling means includes
    a first channel receiving processing stopping controlling unit which stops the receiving process performed by said first channel receiving processing means, when said reception quality determining unit determines that the measurement result is equal to or lower than the threshold value.

5. The mobile terminal according to claim 1, wherein said reception controlling means controls
    each of said channel receiving processing means and said holding means in such a way that said second channel receiving processing means performs a receiving process for a newly received second channel using said information acquired by said first channel receiving processing means, when said reception quality determining unit determines that the measurement result is greater than the threshold value.

6. The mobile terminal according to claim 2, wherein said reception controlling means controls
    each of said channel receiving processing means and said holding means in such a way that said second channel receiving processing means performs a receiving process for a newly received second channel using said information acquired by said first channel receiving processing means, when said reception quality determining unit determines that the measurement result is greater than the threshold value.

7. The mobile terminal according to claim 3, wherein said reception controlling means controls
    each of said channel receiving processing means and said holding means in such away that said second channel receiving processing means performs the receiving process for a newly received second channel using said information acquired by said first channel receiving processing means, when said reception quality determining unit determines that the measurement result is greater than the threshold value.

8. The mobile terminal according to claim 4, wherein said reception controlling means controls
    each of said channel receiving processing means and said holding means in such away that said second channel receiving processing means performs a receiving process for a newly received second channel using said information acquired by said first channel receiving processing means, when said reception quality determining unit determines that the measurement result is greater than the threshold value.

9. The mobile terminal according to claim 1, wherein said reception controlling means includes
    a negotiation controlling unit which negotiates with said base station in advance about a corresponding set of said information regarding the receiving process and said reception quality information in association with each other.

10. The mobile terminal according to claim 2, wherein said reception controlling means includes
    a negotiation controlling unit which negotiates with said base station in advance about a corresponding set of said information regarding the receiving process and said reception quality information in association with each other.

11. A method of controlling reception of a mobile terminal, said method comprising:
    a first channel reception processing step of performing a receiving process for a first channel from a base station and acquiring information regarding a receiving process for a second channel from said base station;
    a second channel reception processing step of performing the receiving process for said second channel, using said information acquired in said first channel reception processing step;
    a holding step of holding reception quality information, said reception quality information being sent to said base station and changing in accordance with reception quality with respect to said base station and corresponding to said information regarding the receiving process; and a reception controlling step of controlling each of said channel reception processing steps and said holding step in such a way that a receiving process for a newly received second channel is performed, wherein said reception controlling step includes a reception quality measuring step which measures reception quality with respect to said base station, a reception quality determining step which determines whether a result of measurement performed by said reception quality measuring step is equal to or lower than a predetermined threshold value; and a controlling step, if the reception quality determining step determines the result of measurement is equal to or lower than the predetermined threshold value, acquiring said information regarding the receiving process and corresponding to the reception quality information held in said holding step, from a table keeping said information regarding the receiving process in association with said reception quality information, and outputting the acquired information as information to be used for the receiving process performed by said second channel reception processing step.

12. The method of controlling reception of a mobile terminal according to claim 11, wherein
said reception controlling step includes
a step of performing said controlling in such a way that said receiving process is performed in said second channel reception processing step, based on a timing determined in accordance with a result of past receiving process performed by said first channel reception processing step.

13. The method of controlling reception of a mobile terminal, according to claim 11, wherein
said reception controlling step includes
a step of using uses the acquired information in said receiving process for said second channel reception processing step.

14. The method of controlling reception of a mobile terminal, according to claim 12, wherein
said reception controlling step includes
a step of using the acquired information in said receiving process for said second channel reception processing step.

* * * * *